(12) United States Patent
Klein

(10) Patent No.: US 8,576,072 B2
(45) Date of Patent: Nov. 5, 2013

(54) OPTOELECTRONIC SENSOR

(75) Inventor: Michael Klein, Waldkirch (DE)

(73) Assignee: Sick AG, Waldkirch (DE)

( * ) Notice: Subject to any disclaimer, the term of this patent is extended or adjusted under 35 U.S.C. 154(b) by 251 days.

(21) Appl. No.: 13/193,251

(22) Filed: Jul. 28, 2011

(65) Prior Publication Data

US 2012/0032800 A1 Feb. 9, 2012

(30) Foreign Application Priority Data

Aug. 6, 2010 (DE) .......................... 10 2010 036 883

(51) Int. Cl.
*G08B 21/00* (2006.01)

(52) U.S. Cl.
USPC .......................... 340/540; 340/628; 340/545.3

(58) Field of Classification Search
USPC ......... 340/540, 603, 627–628, 508, 506, 541, 340/545.3, 555, 557, 599
See application file for complete search history.

(56) References Cited

U.S. PATENT DOCUMENTS

| | | | |
|---|---|---|---|
| 4,864,515 A * | 9/1989 | Deck ............................. | 702/142 |
| 6,091,071 A * | 7/2000 | Franz et al. .................... | 250/372 |
| 6,265,725 B1 * | 7/2001 | Moll et al. ............... | 250/559.38 |
| 6,691,003 B1 * | 2/2004 | Stortz et al. ........................ | 701/1 |
| 6,904,444 B2 * | 6/2005 | Picciolo et al. ............... | 708/322 |
| 7,318,355 B2 * | 1/2008 | Ishikawa .................... | 73/861.25 |
| 8,058,605 B2 * | 11/2011 | Scheiber et al. ............. | 250/221 |
| 2005/0220434 A1 * | 10/2005 | Hsieh ............................ | 385/134 |
| 2010/0219326 A1 * | 9/2010 | Klein et al. ................ | 250/201.1 |

FOREIGN PATENT DOCUMENTS

| | | |
|---|---|---|
| DE | 26 29 476 A1 | 1/1978 |
| DE | 33 04 566 C1 | 12/1992 |
| DE | 43 36 128 C2 | 5/1994 |
| DE | 43 40 756 A1 | 6/1994 |

(Continued)

OTHER PUBLICATIONS

European Search Report, Application No. EP 11 17 1579, dated Oct. 6, 2011.

(Continued)

*Primary Examiner* — Daniel Previl

(74) *Attorney, Agent, or Firm* — Nath, Goldberg & Meyer; Jerald L. Meyer; Sanjana Mangalagiri

(57) ABSTRACT

An optoelectronic sensor (10) is provided with a light transmitter (12) for transmitting a light signal (16) into a monitoring area (18), a light receiver (26) for receiving and converting the light signal (22) remitted or reflected from an object (20) in the monitoring area (18) into a reception signal, a switching output (30) for the output of a switching signal when the reception signal meets a switching criterion (E), a pre-failure alarm output (32) for the output of a pre-failure alarm signal, and an evaluation unit (28) configured to detect a contamination state that is present when the reception signal meets a contamination criterion (C) but not the switching criterion (E) and to output a pre-failure alarm signal when a contamination period during which the contamination state extends for more than a tolerated period ($T_{PFA,ON}$) and/or when a contamination state occurrence number that is incremented upon each entry of the contamination state is larger than a tolerated number. The evaluation unit (28) is further configured to add up the contamination period also across several discontinuous periods of the contamination state or to count the contamination state occurrence number also across periods during which neither the switching criterion (E) nor the contamination criterion (C) are met, respectively.

13 Claims, 2 Drawing Sheets

(56) References Cited

FOREIGN PATENT DOCUMENTS

Figure 1:
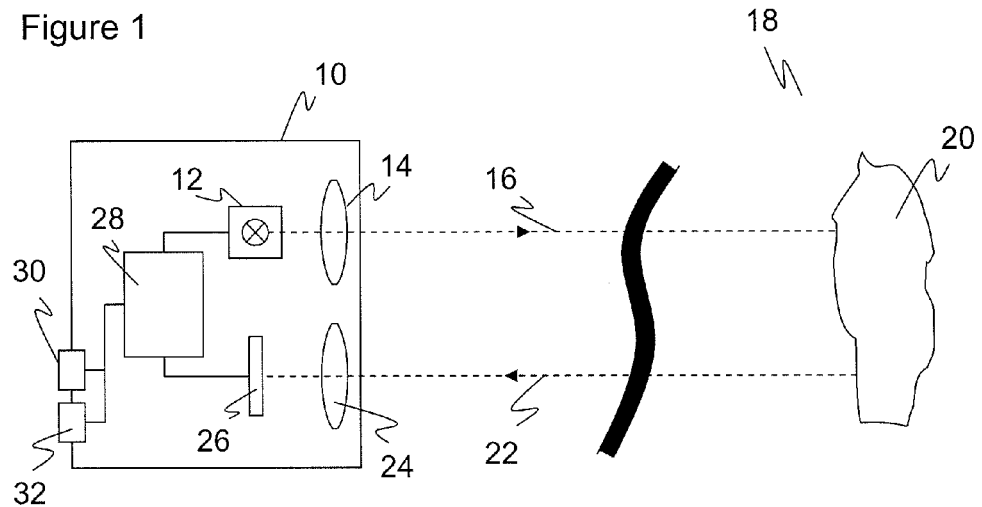

| | | |
|---|---|---|
| DE | 43 24 590 A1 | 1/1995 |
| DE | 296 07 076 U1 | 10/1996 |
| DE | 195 25 057 C1 | 2/1997 |
| DE | 196 52 441 A1 | 6/1998 |
| DE | 197 29 638 A1 | 1/1999 |
| DE | 197 47 248 A1 | 5/1999 |
| DE | 299 23 142 U1 | 5/2000 |
| DE | 20 2007 001 932 U1 | 6/2007 |
| GB | 2 424 272 B | 9/2006 |

OTHER PUBLICATIONS

German Search Report issued Jun. 30, 2011, in corresponding German Patent Application No. 10 2010 036 883.0, eight (8) pages.

\* cited by examiner

OPTOELECTRONIC SENSOR

The invention relates to an optoelectronic sensor with a pre-failure alarm output and a method for monitoring a monitoring area with output of a pre-failure alarm signal according to the preamble of claims 1 and 8, respectively.

Optoelectronic sensors are often used to output a switching signal according to the presence or absence of an object in their monitoring area. Such sensors are, for example, mounted at a conveyor belt and are connected to a control in order to process the switch signal or object detection signal.

A simple sensor of this kind is a light barrier, where a light transmitter and a light receiver face each other and the receiver registers the lack of the light signal upon interruption by an object. Light barriers are also known as reflection light barriers instead of one path light barriers. In that case, light transmitter and light receiver are mounted on the same side facing a reflector.

Light sensors or reflection light sensors of the scanning type are similar to a reflection light barrier in their basic structure but do not have the cooperative reflector. Light sensors of the scanning type thus transmit their transmission light into the open space, and it is reflected and registered if it impinges on an object. In addition to energy based light sensors of the scanning type that evaluate the intensity of the reception signal also triangulation light sensors are known. They triangulate the distance of a detected object from the position and orientation of the optical axes of the light transmitter and a spatially resolving light receiver at an angle to each other and from the position of the received light spot on the spatially resolving light receiver.

Due to continued operation, aging or other factors, the availability for use of the sensors can be affected in the course of time. Possible reasons are contamination of the optical elements such as lenses or a front screen, a decrease in power of the light transmitter, or a misalignment of the optical beam paths. This may lead to an erroneous detection, where an object non-existent in the monitoring area is falsely indicated or, vice versa, an object is overlooked.

To avoid such errors and to at least give warning to the operating personnel of the system in time, sensors are provided with a pre-failure alarm function, whereby they test themselves or are tested to identify a probable failure in the near future. Via so-called pre-failure alarm outputs, the sensors output this warning, a pre-failure alarm signal, to the system control.

A commonly used example criterion for triggering the pre-failure alarm signal is the falling of the reception signal level below a certain critical threshold. This works fairly reliable with light barriers because the continuous light beam and the reflector, respectively, enable a continuous reference measurement of the reception signal level in absence of objects. As long as the objects to be detected have only very low variations in contrast, also a light sensor of the scanning type without a cooperative reflector detects an impending failure by means of the, in that case, relatively continuous reception signal level. This precondition for the objects is but very rarely given in practice.

That is why the contamination output or pre-failure alarm output is set in the prior art once the reception signal level falls below a contamination threshold for a certain minimum dwell period in absence of objects, i.e. without switching. As an alternative, it is counted whether the reception signal level enters a range between the switching threshold and the contamination threshold too often. The minimum dwell period and the contamination counter, respectively, are reset as soon as the reception signal level exceeds the contamination threshold at least for a short time, because it is assumed at this high reception signal level that all optical paths are faultless.

The consequence of this approach is that the pre-failure alarm output does not respond reliably and in time. Two examples are considered for explanation. In the first example, the sensor is used to detect printed paper or printed cardboard boxes with light-dark contrasts. If the sensor is contaminated, the reception signal level falls below the contamination threshold at darker areas. However, at lighter areas, the contamination threshold is exceeded again, hence, the minimum dwell period or the contamination counter is reset, and no pre-failure alarm signal is output.

In the second example, relatively homogeneous objects are detected that, however, differ from each other, as black and yellow boxes. If the objects move relatively fast, this case with fast light-dark-transitions corresponds to the first example. But even if the objects remain within the detection area of the sensor long enough to meet the minimum dwell period condition, the pre-failure alarm output will respond to the dark object just to be immediately reset at the subsequent light object. Thus, no reliable pre-failure alarm signal is generated in any case.

Document DE 20 2007 001 932 U1 describes a sensor with a pre-failure alarm output for the detection of an object. However, DE 20 2007 001 932 U1 does not address the problem of unreliable detection of pre-failure in case of high-contrast objects.

It is therefore an object of the invention to improve the pre-failure alarm of a sensor of the kind in question at the detection of high-contrast objects.

This object is satisfied by an optoelectronic sensor with a pre-failure alarm output according to claim 1 and a method for monitoring a monitoring area with output of a pre-failure alarm signal according to claim 8, respectively. The invention starts from the basic idea to evaluate an exceedingly long duration of a contamination state and/or an exceedingly frequent entering into a contamination state as a contamination criterion. In contrast to the prior art, it is not assumed that there is no contamination as soon as there is a sufficient reception signal level for a short time and, thus, the sensor is outside the switching state and the contamination state. This could also be the result of a light object area during a continued contamination. Instead, the contamination period is also added up across several discontinuous periods of the contamination state or the frequency of entering the contamination state is also counted across such periods, respectively. The dynamics of the object contrasts are considered for the reset at activated pre-failure alarm.

The invention has the advantage that the actual contamination state is output at the pre-failure alarm output irrespective of variations in the reception signal due to contrasts of the objects. Hence, the pre-failure alarm output responds reliably and in time also for objects such as printed paper or objects with similar light-dark contrasts or even black-white contrasts. This is particularly useful if the larger fraction of the target objects are detected with sufficient signal margin due to high remission, but a smaller fraction satisfy the contamination criterion because of poor remission. A reliable pre-failure alarm is also generated in this situation, such that the fraction of the target objects having a poor remission are reliably detected as well, or at least the sensor gives warning in time.

The switching criterion is preferably the falling of the reception signal below a switching threshold, and the contamination criterion is preferably the falling of the reception signal below a contamination threshold greater than the switching threshold. In this and subsequent paragraphs, the term preferably describes preferred, but optional features that are not necessarily required for the invention. With threshold evaluations, signal margins can be easily and reliably evaluated. The thresholds could in principle also be arranged in reverse order, and the signal exceeds these reversed thresholds rather than falling below. This situation corresponds for example to a negated reception signal. Here and in the following, no distinction is made for these completely equivalent cases, and both alternate situations are meant to be covered.

The contamination state is preferably present when the reception signal is between the switching threshold and the contamination threshold, wherein the contamination state is entered when the reception signal falls below the contamination threshold but not below the switching threshold or when the switching threshold is exceeded without exceeding the contamination threshold. The contamination state is present as long as the sensor remains in this state. This is for example the case while the reception signal is in an intermediate range above the switching threshold and below the contamination threshold. In contrast, the contamination state is entered when the sensor moves into the contamination state. There are at least two possibilities to do so. A previously strong reception signal above the contamination threshold can fall below the contamination threshold without decreasing far enough to cause a switching as well. The second possible way to enter the contamination state is when the reception signal comes form the switching state below the switching threshold but does not exceed the contamination threshold.

The evaluation unit is preferably configured to no longer output the pre-failure alarm signal when, for a reset minimum period, neither a switching signal is output at the switching output nor the contamination state is present. After such a prolonged period with sufficient reception level, no pre-failure alarm signal is output any more, i.e. the pre-failure alarm output is reset. The required reset minimum period depends strongly on the application, in particular on the typical brightness dynamics of the objects to be detected and on typical dwell periods within the detection area of the sensor. Possible orders of magnitude range from, for example, 100 ms for relatively small or high-contrast, fast moving objects up to 30 s for larger or low-contrast, slower objects.

The evaluation unit is preferably configured to consider only periods during which the reception signal varies by more than a minimum noise level when testing for the reset minimum period. This prevents resetting of the pre-failure alarm output when the target objects do not move and a light object area is currently detected by the sensor. With sufficient signal dynamics, which is preferably above an expected noise level of the sensor, a stoppage of the objects is excluded. If nevertheless a sufficiently strong reception signal is detected, this cannot be caused by an accidental persistence of a light object area, and resetting of the pre-failure alarm output is justified.

The evaluation unit is preferably configured to add up discontinuous periods when testing for the reset minimum period also across discontinuities during which the switching criterion is met. During switching, the reception signal is very low due to the detected object, irrespective of a contamination state. Such periods do not change the fact that, in this preferred embodiment, a period to be tested against the reset minimum period is continued after an end of the switching state. At the same time, the reception signal must not be in a range between the switching threshold and the contamination threshold, because this in turn could be an indication of too low a signal margin.

The sensor is preferably made as an optical light sensor of the scanning type without a cooperative target, in particular a light sensor based on received intensity or a triangulation light sensor. Light barriers may alternatively use the continuous beam as a reference. Therefore, the invention is particularly advantageous for sensors of the scanning type where no such reference exists.

The method in accordance with the invention can be further developed in a similar manner with additional features and shows similar advantages. Such advantageous features are described in an exemplary, but not exclusive manner in the subordinate claims following the independent claims.

Figure 2:
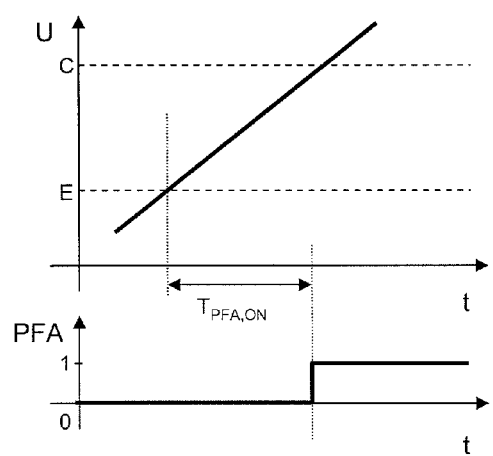
Figure 3:
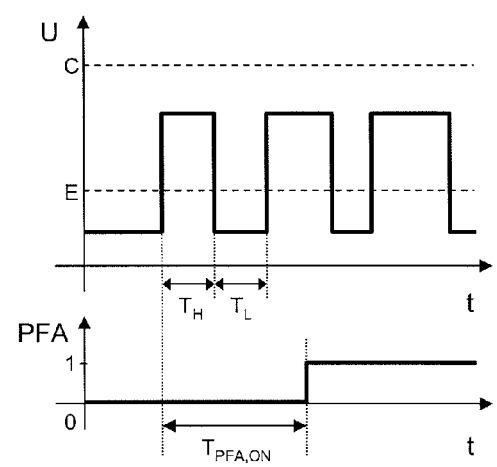
Figure 4:
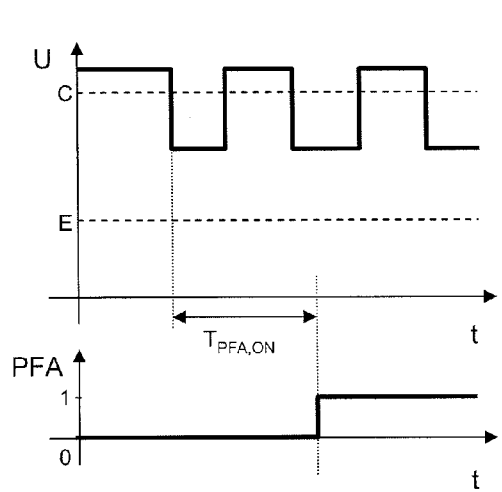
Figure 5:
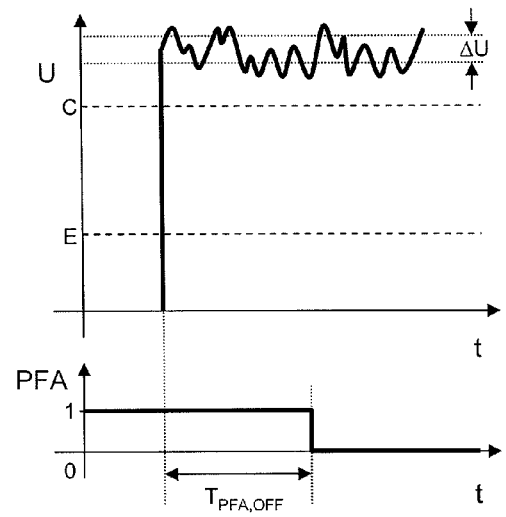
Figure 6:
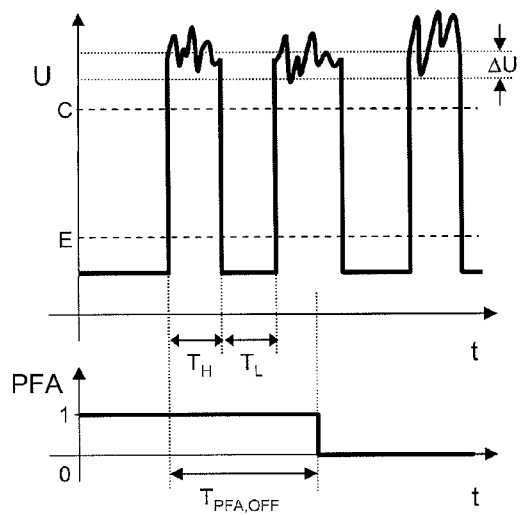

The invention will be explained in the following also with respect to further advantages and features with reference to exemplary embodiments and the enclosed drawing. The Figures of the drawing show in:

FIG. 1 a schematic cross sectional view of a sensor according to the invention;

FIG. 2 a representation of the reception signal in dependence of time in order to explain the tolerated period;

FIG. 3 a representation of the reception signal in dependence of time in order to explain the contamination state after switching events;

FIG. 4 a representation of the reception signal in dependence of time in order to explain the contamination state without switching events;

FIG. 5 a representation of the reception signal in dependence of time in order to explain the resetting of the pre-failure alarm output in a situation without switching events; and FIG. 6 a representation of the reception signal in dependence of time in order to explain the resetting of the pre-failure alarm output in a situation with switching events.

FIG. 1 shows a schematic cross sectional view of an exemplary sensor 10 according to the invention. Other types of sensors that are not represented in the drawing are also encompassed by the invention, for example sensors having a confocal design e.g. by means of a beam splitter.

A light transmitter 12 having a light source, for example an LED or a laser light source, transmits, via a transmission optical system 14, a light beam 16 into a monitoring area 18. If the light beam 16 impinges on an object 20 in the monitoring area 18, a portion of the light beam 16 is remitted or reflected and returns to the sensor 10 as reception light 22. A receiving optical system 24 directs the reception light 22 onto a light receiver 26, where the reception light 22 is converted into an electronic signal. The light receiver 26 is for example made as a photo diode. If the sensor 10 is a triangulation light sensor, the light receiver 26 is spatially resolving, therefore, includes at least a line of individual reception pixels, as in a CCD or CMOS image sensor.

A control and evaluation unit 28 is connected to the light emitter 12 and the light receiver 26. The evaluation unit 28 detects from the reception signal whether or not an object 20 is present in the monitoring area 18. The result of this object detection is output as a switching signal at a switching output 30. A simple exemplary method of evaluation comprises comparison of the reception signal with a switching threshold and a switching whenever the reception signal level falls below the switching threshold.

The evaluation unit 28 also detects, in a way explained in more detail below with reference to FIGS. 2 to 6, if enough signal margin is available and if a failure or a decrease in detection power of the sensor 10 is imminent. In that case, a warning called a pre-failure alarm signal is output at a pre-failure alarm output 32.

In a typical application, the sensor 10 is mounted at a monitoring area 12 in which objects 20 are moving relative to the sensor 10, for example at a conveyor belt. The objects 20 enter the monitoring area 18 and are detected by the sensor 10 that correspondingly outputs the object detection signal at the switching output 30. In case the switching output 30 is connected to a higher level control, subsequent processing steps can be performed with the object 20, for example by triggering a processing machine or a sorting.

FIG. 2 shows a first exemplary reception signal of the light detector 26 as a graph of voltage versus time. Voltage is only an exemplary parameter measuring the intensity of the reception signal level. Some sensors 10 do not directly measure the intensity of the received light 22, but a difference signal. In these cases, the effective reception signal as used for the threshold evaluation is referred to in this description.

As a simple contamination criterion, the evaluation unit 28 determines if the reception signal, after exceeding the switching threshold E, is in a contamination state between the switching threshold E and a contamination threshold C above the switching threshold E for longer than a tolerated period $T_{PFA,ON}$ of for example 2 seconds. As soon as the contamination state persists for more than the tolerated period $T_{PFA,ON}$, the pre-failure alarm output 32 is activated, as illustrated in the lower part of FIG. 2 by means of the binary signal PFA.

FIG. 3 shows another example of a reception signal, wherein this and further representations are of analogous construction to FIG. 2. Here, the reception signal changes several times between the switching state, that in each instance continues for a period of time $T_H$, and a higher reception signal level, that in each instance continues for a period of time $T_L$, and during which the switching output 30 is not switched, wherein the higher reception signal level, however, remains below the contamination threshold C.

The evaluation unit 28 switches the pre-failure alarm output 32 as soon as the total time period during which the reception signal is between the switching threshold E and the pre-failure alarm threshold 32 exceeds the allowable tolerated period $T_{PFA,ON}$. The duration of intermediate switching states $T_L$ may both be included or excluded from the calculation of the total time period.

As an alternative, it is counted how often a transition from the switching state below the switching threshold E into the contamination state between switching threshold E and contamination threshold C occurs. Once this happens more often than a tolerated number, the sensor 10 is considered to be contaminated. Both criteria can be mixed, i.e. it is tested how often and/or how long the contamination state is present, or, when counting the occurrence number, only events are counted where the contamination state persists for a certain minimum or maximum duration.

FIG. 4 shows another example of a time course of the reception signal that repeatedly falls below the contamination threshold C without also triggering a switching event by falling below the switching threshold E. Such a reception signal is detected at light-dark-transitions with a sensor 10 that does not detect dark object areas with sufficient signal margin due to contamination. The criteria for the detection of contamination are similar to that in FIG. 3. It is evaluated if a contamination state continues for more than a tolerated period $T_{PFA,ON}$ and/or if the reception signal enters the contamination state below the contamination threshold, but above the switching threshold too often. The intermediate exceeding of the contamination threshold C does not lead to a reset of the measured duration of the contamination state or the counted transitions into the contamination state. The evaluation unit 28 does not presume that an intermediate recovery of the reception signal level is an indication for a faultless light path, but merely assumes intermediate lighter object areas.

The criteria illustrated in FIGS. 3 and 4 are preferably applied simultaneously. The evaluation unit 28 thus measures the total period added up from periods where the reception signal is in the contamination state between the switching threshold S and the contamination threshold C, and/or the evaluation unit 28 counts how often the contamination state is entered. Therein, it is measured and counted across intermediate periods during which the reception signal level falls below the switching threshold E or exceeds the contamination threshold C.

With reference to FIGS. 5 and 6, it is explained how the sensor 10 resets the pre-failure alarm output 32, for example after a front screen has been cleaned or the monitoring area 18 is again free of interfering particles such as dust or the like.

For this purpose, as shown in FIG. 5, a time measurement is started once the reception signal exceeds the contamination threshold C. If this continues for more than a reset minimum period $T_{PFA,OFF}$, the pre-failure alarm output 32 is reset, for example switched from a binary One to a binary Zero. The reset minimum period $T_{PFA,OFF}$ is to be selected in dependence of the application, as is the tolerated period $T_{PFA,ON}$. With fast processes, as in a printing machine, shorter periods are necessary than, for example, in conveyor technology.

In order to exclude the possibility that an exceeding of the contamination threshold C is merely due to a random persistence of a particularly light object area, it is also evaluated if the reception signal has sufficient dynamics. To that end, a corridor with a minimum noise level $\Delta U$, for example a certain percentage of the reception signal or the contamination threshold C, is placed around the reception signal, and it is required that the reception signal varies at least to this extend. This procedure prevents that the pre-failure alarm output 32 is reset if the target objects do not move, and a light contrast is present in the light beam. If the target objects are moving, at least some signal variations are present even for objects that seem to be visually homogenous.

FIG. 6 shows the resetting of the pre-failure alarm output 32 for a reception signal where in contrast to FIG. 5 switching events occur during the reset minimum period $T_{PFA,OFF}$. Such a switching event interrupts the time measurement. The time measurement is either restarted when the reception signal again exceeds the contamination threshold C, or the time measurement adds up several periods during which the contamination threshold C is exceeded.

Thus, the invention enables to reliably and in time output the pre-failure alarm signal also for objects 20 having light-dark variations, and to also reliably reset the pre-failure alarm output 32 once the fault or contamination no longer exists.

The invention claimed is:

1. An optoelectronic sensor (10) with a light transmitter (12) for transmitting a light signal (16) into a monitoring area (18), a light receiver (26) for receiving and converting the light signal (22) remitted or reflected from an object (20) in the monitoring area (18) into a reception signal, a switching output (30) for the output of a switching signal when the reception signal meets a switching criterion (E), a pre-failure alarm output (32) for the output of a pre-failure alarm signal, and an evaluation unit (28) configured to detect a contamination state that is present when the reception signal meets a contamination criterion (C) but not the switching criterion (E) and to output a pre-failure alarm signal when a contamination period during which the contamination state extends for more than a tolerated period ($T_{PFA,ON}$) and/or when a contamination state occurrence number that is incremented upon each entry of the contamination state is larger than a tolerated number, characterized in that the evaluation unit (28) is configured to add up the contamination period also across several discontinuous periods of the contamination state or to count the contamination state occurrence number also across periods during which neither the switching criterion (E) nor the contamination criterion (C) are met, respectively.

2. The sensor (10) of claim 1, wherein the switching criterion is the falling of the reception signal below a switching threshold (E) and the contamination criterion is the falling of the reception signal below a contamination threshold (C) greater than the switching threshold (E).

3. The sensor (10) of claim 2, wherein the contamination state is present when the reception signal is between the switching threshold (E) and the contamination threshold (C), and wherein the contamination state is entered when the reception signal falls below the contamination threshold (C) but not below the switching threshold (E) or when the switching threshold (E) is exceeded without exceeding the contamination threshold (C).

4. The sensor (10) of claim 1, wherein the evaluation unit (28) is configured to no longer output the pre-failure alarm signal when, for a reset minimum period ($T_{PFA,OFF}$), neither a switching signal is output at the switching output (30) nor the contamination state is present.

5. The sensor (10) of claim 4, wherein the evaluation unit (28) is configured to consider only periods during which the reception signal varies by more than a minimum noise level ($\Delta U$) when testing for the reset minimum period ($T_{PFA,OFF}$).

6. The sensor (10) of claim 4, wherein the evaluation unit (28) is configured to add up discontinuous periods when testing for the reset minimum period ($T_{PFA,OFF}$) also across discontinuities during which the switching criterion (E) is met.

7. The sensor (10) of claim 1, wherein the sensor (10) is made as an optical light sensor of the scanning type without a cooperative target, in particular a light sensor based on received intensity or a triangulation light sensor.

8. Method for monitoring a monitoring area (18), in which a light signal (16) is transmitted into the monitoring area (18), the light signal (22) remitted or reflected from objects (20) in the monitoring area (18) is received and converted into a reception signal, wherein a switching signal is output at a switching output (30) when the reception signal meets a switching criterion (E), wherein a contamination state is detected when the reception signal meets a contamination criterion (C) but not the switching criterion (E), and wherein a pre-failure alarm signal is output at a pre-failure alarm output (32) when a contamination period during which the contamination state is present extends for more than a tolerated period ($T_{OFA,ON}$) and/or when a contamination state occurrence number that is incremented upon each entry of the contamination state is larger than a tolerated number, characterized in that the contamination period is added up also across several discontinuous periods of the contamination state or that the contamination state occurrence number is counted also across periods during which neither the switching criterion (E) nor the contamination criterion (C) are met, respectively.

9. The method of claim 8, wherein the falling of the reception signal below a switching threshold (E) is detected as the switching criterion and the falling of the reception signal below a contamination threshold (C) greater than the switching threshold (E) is detected as the contamination criterion.

10. The method of claim 9, wherein the contamination state is present when the reception signal is between the switching threshold (E) and the contamination threshold (C), and wherein the contamination state is entered when the reception signal falls below the contamination threshold (C) but not below the switching threshold (E), or when the switching threshold (E) is exceeded without exceeding the contamination threshold (C).

11. The method of claim 8, wherein the pre-failure alarm signal is no longer output when, for a reset minimum period ($T_{PFA,OFF}$), neither a switching signal is output nor the contamination state is present.

12. The method of claim 11, wherein only periods during which the reception signal varies by more than a minimum noise level ($\Delta U$) are considered when testing for the reset minimum period ($T_{PFA,OFF}$).

13. The method of claim 11, wherein, when testing for the reset minimum period ($T_{PFA,OFF}$), discontinuous periods are also added up across discontinuities during which the switching criterion (E) is met.

* * * * *